US011100169B2

(12) United States Patent
Zheng et al.

(10) Patent No.: US 11,100,169 B2
(45) Date of Patent: Aug. 24, 2021

(54) ALTERNATIVE QUERY SUGGESTION IN ELECTRONIC SEARCHING

(71) Applicant: TARGET BRANDS, INC., Minneapolis, MN (US)

(72) Inventors: Zhiping Zheng, Los Altos, CA (US); Howard Wan, Waltham, MA (US)

(73) Assignee: TARGET BRANDS, INC., Minneapolis, MN (US)

(*) Notice: Subject to any disclaimer, the term of this patent is extended or adjusted under 35 U.S.C. 154(b) by 371 days.

(21) Appl. No.: 16/153,263

(22) Filed: Oct. 5, 2018

(65) Prior Publication Data
US 2019/0108235 A1    Apr. 11, 2019

Related U.S. Application Data

(60) Provisional application No. 62/569,131, filed on Oct. 6, 2017.

(51) Int. Cl.
*G06F 16/00*      (2019.01)
*G06F 16/9032*    (2019.01)
*G06F 16/248*     (2019.01)
*G06F 16/9535*    (2019.01)
*G06F 16/2457*    (2019.01)
*G06F 16/9536*    (2019.01)

(52) U.S. Cl.
CPC ...... *G06F 16/90324* (2019.01); *G06F 16/248* (2019.01); *G06F 16/24578* (2019.01); *G06F 16/9535* (2019.01); *G06F 16/9536* (2019.01)

(58) Field of Classification Search
CPC ............ G06F 16/24578; G06F 16/248; G06F 16/90324; G06F 16/9535; G06F 16/9536; G06F 16/332; G06F 16/3322
USPC ....................................................... 707/728
See application file for complete search history.

(56) References Cited

U.S. PATENT DOCUMENTS

| | | | |
|---|---|---|---|
| 6,567,802 B1 | 5/2003 | Popa et al. | |
| 6,701,309 B1* | 3/2004 | Beeferman | ......... G06F 16/3325 |
| 6,772,150 B1 | 8/2004 | Whitman et al. | |
| 7,725,485 B1 | 5/2010 | Sahami et al. | |
| 8,438,142 B2 | 5/2013 | Wu et al. | |
| 8,595,252 B2 | 11/2013 | Wu et al. | |
| 8,700,544 B2 | 4/2014 | Sontag et al. | |

(Continued)

*Primary Examiner* — Vincent F Boccio
(74) *Attorney, Agent, or Firm* — Hamre, Schumann, Mueller & Larson, P.C.

(57) ABSTRACT

Systems and methods for receiving a search query and suggesting one or more alternative queries based on the received search query when processing an electronic search are disclosed. The method includes receiving, by a server, an electronic search query from a user device of a user; obtaining one or more search results responsive to the electronic search query; obtaining a suggested electronic search query based on the electronic search query as received; the suggested electronic search query determined based on information representative of an importance of the electronic search query; generating an electronic response including the one or more search results and the suggested electronic search query for display on a display of the user device; and providing the electronic response including the one or more search results and the suggested electronic search query as a hyperlink to the user device for display on the display of the user device.

20 Claims, 8 Drawing Sheets

(56) References Cited

U.S. PATENT DOCUMENTS

| | | | |
|---|---|---|---|
| 8,700,621 B1 * | 4/2014 | Choi | G06F 16/3322 707/730 |
| 9,183,323 B1 | 11/2015 | Shaw | |
| 10,437,902 B1 * | 10/2019 | Jain | G06F 16/35 |
| 2008/0195601 A1 | 8/2008 | Ntoulas et al. | |
| 2009/0077037 A1 | 3/2009 | Wu et al. | |
| 2010/0185644 A1 | 7/2010 | Gutt et al. | |
| 2010/0250547 A1 | 9/2010 | Grefenstette et al. | |
| 2012/0259829 A1 | 10/2012 | Zhou | |
| 2014/0195506 A1 * | 7/2014 | Perlegos | G06F 16/3322 707/706 |
| 2015/0095194 A1 | 4/2015 | Maslovskis | |

* cited by examiner

ALTERNATIVE QUERY SUGGESTION IN ELECTRONIC SEARCHING

FIELD

This disclosure relates generally to electronic search processing. More specifically, this disclosure relates to systems and methods for receiving an electronic search query from a user and electronically sending one or more suggested electronic search queries to the user for display on a user device based on the electronic search query as received when processing the electronic search query from the user.

BACKGROUND

Consumers purchase products in retail stores and via retail websites accessible from the Internet. Shopping via a retail website allows consumers to interact with text, pictures, videos, and/or audio clips relating to the products the consumer is contemplating purchasing. Often, shopping via the retail website allows the consumer to read reviews by other consumers, search for related products, and search for products that other consumers bought at the same time, or the like. In some instances, the inventory of products available from a retailer through the retail website can be different from the products available at the retail store.

Improved ways to enhance a consumer's shopping experience are desirable.

SUMMARY

This disclosure relates generally to electronic search processing. More specifically, this disclosure relates to systems and methods for receiving an electronic search query from a user and electronically sending one or more suggested electronic search queries to the user for display on a user device based on the electronic search query as received when processing the electronic search query from the user.

A computer-implemented method is described. The method includes receiving, by a server, an electronic search query from a user device of a user. The method further includes obtaining one or more search results responsive to the electronic search query; and obtaining a suggested electronic search query based on the electronic search query as received. The suggested electronic search query is determined based on information representative of an importance of the electronic search query. The method further includes generating an electronic response including the one or more search results and the suggested electronic search query for display on a display of the user device. The method also includes providing the electronic response including the one or more search results and the suggested electronic search query to the user device for display on the display of the user device via a network. The suggested electronic search query is provided as a hyperlink. When the user selects the suggested electronic search query, a request is electronically sent to the server and one or more search results are obtained in response to the suggested electronic search query. The suggested electronic search query is different from, but related to, the electronic search query as received.

A system is also disclosed. The system includes a server. The server includes a historical suggestion builder that generates a first plurality of databases that store one or more first electronic search query suggestions; and a catalog suggestion builder that generates a second plurality of databases that store one or more second electronic search query suggestions. The server also includes a suggestion candidate generator that, in response to electronically receiving an electronic search query input from a user device, identifies one or more suggested electronic search queries from the one or more first electronic search query suggestions and the one or more second electronic search query suggestions. The server provides the one or more suggested electronic search queries for display on a display of the user device. The one or more suggested electronic search queries are provided as hyperlinks. When a user selects one of the one or more suggested electronic search queries, a request is electronically sent to the server, and one or more search results in response to the one of the one or more suggested electronic search queries are obtained. The one or more suggested electronic search queries are different from, but related to, an electronic search query received from a user.

A query suggestion system is also disclosed. The query suggestion system includes a suggestion building means that generates a plurality of databases that store one or more keywords and statistical information associated with the one or more keywords. The statistical information includes a ranking score to order the one or more keywords. The ranking score is utilized to determine which of the one or more keywords is appropriate for a suggested query.

BRIEF DESCRIPTION OF THE DRAWINGS

References are made to the accompanying drawings that form a part of this disclosure and which illustrate embodiments in which the systems and methods described in this specification can be practiced.

Like reference numbers represent like parts throughout.

DETAILED DESCRIPTION

Figure 1:
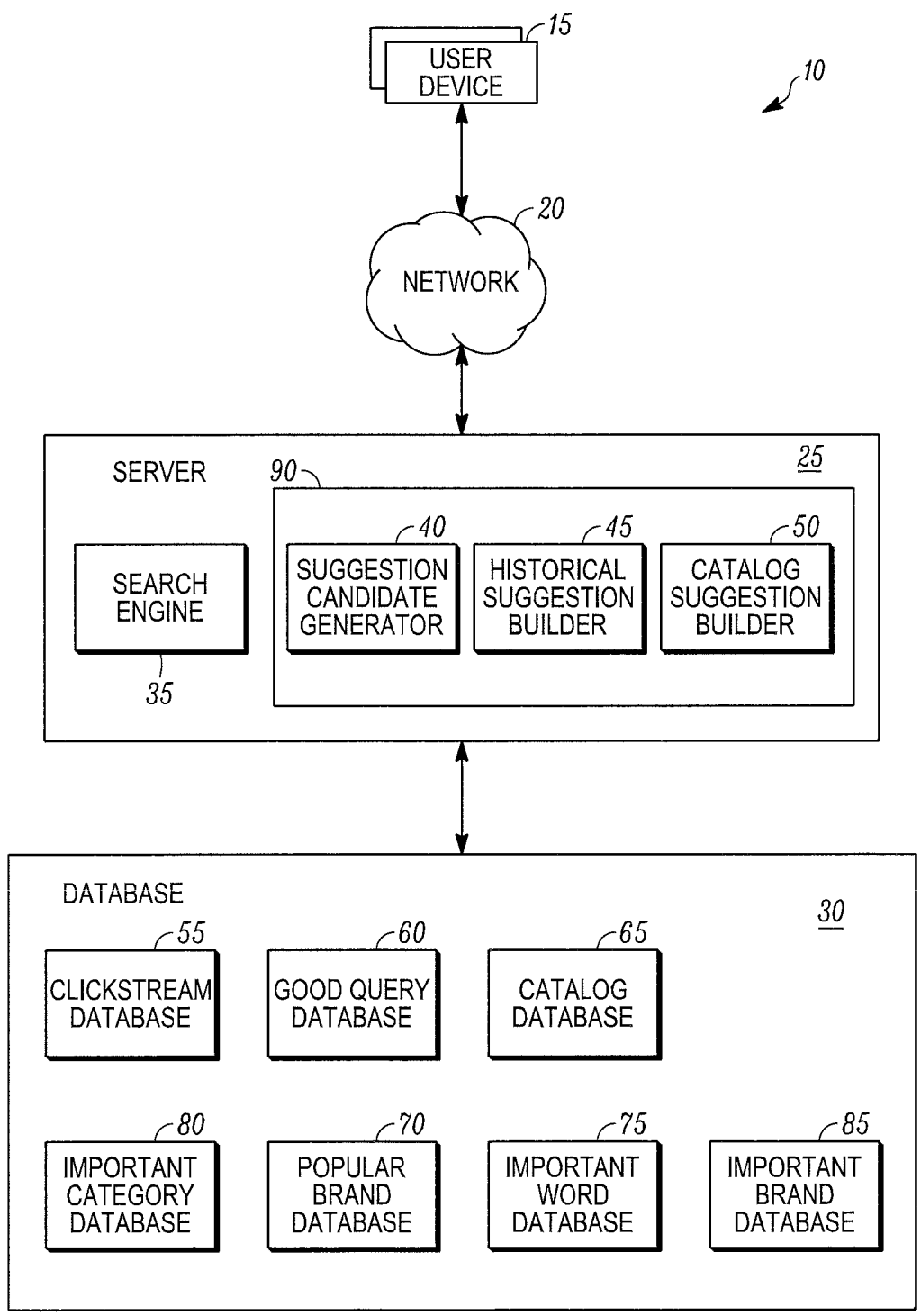
FIG. 1 is a schematic diagram of a system for implementing the electronic query suggestion systems and methods described in this specification, according to an embodiment.

This disclosure relates generally to electronic search processing. More specifically, this disclosure relates to systems and methods for receiving an electronic search query from a user and electronically sending one or more suggested electronic search queries to the user for display on a user device based on the electronic search query as received when processing the electronic search query from the user.

A retail website can include an electronic search engine ("search engine"). A search engine generally refers to a software system that enables electronic searching of information typically based on an electronic search query input by a user. The information may be electronically stored in one or more particular locations such as, but not limited to, the Internet, a database, a plurality of databases, or the like. For example, a search engine for a retail website can be used by a user of the retail website to search through an inventory of products that are available from the retailer (e.g., one or more products that are available for purchase via the website, in a retail store of the retailer, or a combination thereof, etc.). When the user performs an electronic search using the search engine, the user's electronic search query is often referred to as the user's search, the user's query, or the user's search query. The terms included in the electronic search query may be referred to as the keywords of the search, the keywords of the query, or the keywords of the search query.

The search engine can be part of an electronic search system ("search system"). The search system can include, for example, a search input (e.g., a text box, etc.) displayed on the retail website, an electronic spell checker ("spell checker"), and the search engine. The search system can include one or more other features such as, but not limited to, an electronic search term predictor ("search term predictor"), or the like. The search engine can return search results electronically to the user (e.g., for display on a display of a computer device). Embodiments described in this specification include providing one or more suggested electronic search queries that are alternative to the electronic search query as received from the user and that can be returned electronically to the user for display on a user device.

An electronic search (or search) generally includes one or more keywords which are input into a search input of a search engine.

Clickstream data generally includes a series of selections made by a user when browsing a website or software application. Clickstream data can be associated with an electronic search query. For example, in an embodiment, clickstream data can include information indicating what type of action the user took in response to electronic search results received for a particular electronic search query. Actions can include, for example, a selection to view more information about a product; a selection to add a product to the user's electronic shopping cart; and/or a selection to purchase a product.

An n-gram is a contiguous sequence of n items from a given sequence of text. For example, in one embodiment, an n-gram can be a sequence of characters. In another embodiment, an n-gram can be a sequence of words. An n-gram of size one may be referred to as a unigram. An n-gram of size two may be referred to as a bigram. For example, a unigram that can be generated from "hello" includes "h," "e," "l," "l," and "o." A unigram that can be generated from "baby boy birthday" includes "baby," "boy," and "birthday." Relying upon the same examples, a bigram that can be generated from "hello" includes "he," "el," "ll," and "lo." A bigram that can be generated from "baby boy birthday" includes "baby boy" and "boy birthday."

A token can include a portion of a string of characters. For example, a string including the phrase "baby boy clothes" includes three tokens: "baby," "boy," and "clothes."

A suggested electronic search query can include a refinement to an electronic search query entered by a user or a redirection of the electronic search query entered by the user. A refinement of the originally entered electronic search query may be, for example, a more specific electronic search query than was entered by the user. For example, if the user enters the electronic search query "baby boy clothes," a refinement of the electronic search query may be "baby boy pajamas," which are a subset of baby boy clothes. A redirection of the originally entered electronic search query may be, for example, an alternative electronic search query to the electronic search query entered by the user. For example, if the user enters the electronic search query "baby boy clothes," a redirection of the electronic search query may be "baby toys." A suggested electronic search query can also be referred to as an alternative electronic search query, an electronic search query suggestion, or the like. In an embodiment, the suggested electronic search query can include a word in common with the electronic search query entered by the user. In an embodiment, the suggested electronic search query can include a synonym of a word in the electronic search query entered by the user.

A category includes a grouping of products having shared characteristics. For example, a category of "cotton sheets" may be "bedding" or the like.

A brand includes a type of product manufactured or sold by a particular company under a particular name.

FIG. 1 is a schematic diagram of a system 10 for implementing the electronic search query suggestion systems and methods described in this specification, according to an embodiment. The system 10 can be used to provide one or more electronic search query suggestions in response to a search input (e.g., an electronic search query) by a user of a website (e.g., a website of a retailer, an application of a retailer for a mobile device, etc.).

The system 10 includes a server 25 in communication with a user device 15 via a network 20. The server 25 can make a website available to the user device 15. An example of the website or other user interface is shown and described in additional detail in accordance with FIG. 2 below. The server 25 can make the website or other user interface available to the user device 15 via the network 20. In an embodiment, the website or other user interface can enable a user to electronically search a product database (e.g., catalog database 65 described below) available from a retailer (e.g., via the retailer's website or via the retailer's store in instances in which the retailer also has a retail store) on the user device 15 via the network 20. It will be appreciated that the website or other user interface may be made available by one or more servers that are separate from the server 25. Also, it will be appreciated that the server 25 can be implemented on a distributed network of servers. In an embodiment, aspects of the server 25 can be the same as or similar to aspects of the server device 535 shown and described in accordance with FIG. 8 below.

The server 25 includes a search engine 35, a suggestion candidate generator 40, a historical suggestion builder 45, and a catalog suggestion builder 50. In an embodiment, the suggestion candidate generator 40, the historical suggestion builder 45, and the catalog suggestion builder 50 may be collectively referred to as a suggestion building means 90. The server 25 can include fewer or additional aspects. For example, the server 25 can include a GUI builder. In an embodiment, the server 25 can include one or more electronic search processing features, such as, but not limited to, a search classifier, a search term prediction means, a spell checker, or the like.

In an embodiment, the network 20 is representative of the Internet. In an embodiment, the network 20 can include a local area network (LAN), a wide area network (WAN), a wireless network, a cellular data network, suitable combinations thereof, or the like. In an embodiment, aspects of the network 20 can be the same as or similar to aspects of the network 540 as shown and described in accordance with FIG. 8 below.

The user can electronically search an inventory of items available for purchase from a retailer (e.g., either from the retailer's website or from the retailer's store) via the user device 15. Examples of the user device 15 include, but are not limited to, a personal computer (PC), a laptop computer, a mobile device (e.g., a smartphone, a personal digital assistant (PDA), a tablet-style device, etc.), a wearable mobile device (e.g., a smart watch, head wearable device, etc.), or the like. The user device 15 generally includes a display device and an input device. A GUI for searching the inventory of items sold by the retailer can be displayed on the display device of the user device 15. Examples of the display device for the user device 15 include, but are not limited to, a monitor connected to a PC, a laptop screen, a mobile device screen, a tablet screen, or the like. Examples of the input device for the user device 15 include, but are not limited to, a keyboard, a mouse, a trackball, a button, a voice command, a proximity sensor, an ocular sensing device for determining an input based on eye movements (e.g., scrolling based on an eye movement), or the like. In an embodiment, aspects of the user device 15 can be the same as or similar to aspects of user devices 501 as shown and described in accordance with FIG. 8 below.

The server 25 is in communication with a database 30. The database 30 includes a clickstream database 55, a good query database 60, a catalog database 65, a popular brand database 70, an important word database 75, an important category database 80, and an important brand database 85. It will be appreciated that these databases are examples. Additional databases can be included. One or more of the databases 55-85 can alternatively be combined.

The database 30 may be updated on a periodic basis. For example, the database 30 may be updated on a daily basis. The database 30 can be updated on a schedule other than daily. In an embodiment, the update schedule for the database 30 can be based on, for example, an amount of data to be stored and a duration for updating the database 30. If, for example, the database 30 takes more than 24 hours to be updated, then the update schedule may be less frequent than daily.

The database 30 generally includes a variety of information on click and sales data from a retailer, such as the clickstream database 55. The clickstream database 55 can include click and sales data such as, but not limited to, a listing of searches performed by users of the website, along with clicks the users performed in response to those searches (e.g., which products the users clicked on from the search results, etc.), whether the users added any products from the search results to a shopping cart for purchase, and which product(s) the users ultimately added to the shopping cart for purchase. The clickstream database 55 can include the click and sales data for a particular period of time. For example, in an embodiment, the clickstream database 55 can include click and sales data for the previous calendar year. The amount of click and sales data in the clickstream database 55 can vary. The amount of click and sales data (e.g., number of entries, time period of data, etc.) can contribute to an accuracy of the suggestion candidate generator 40.

The good query database 60 can include a listing of electronic search queries which have been searched by users and that have been identified as being in the catalog database 65. That is, in one embodiment entries in the database 60 should also be present in the catalog database 65. The database 60 can include additional information such as, but not limited to, statistical information which can include, for example, a frequency of which the keyword has been queried, and/or a ranking score for the keyword. The ranking score can, for example, be an indicator of how often the keyword results in a positive action (e.g., a click, a cart add, a purchase, etc.) for the retailer. The statistical information including the ranking score and the frequency can be determined based on the information in the clickstream database 55. In an embodiment, the good query database 60 can be created, for example, based on information that is available in the clickstream database 55 and the catalog database 65. In an embodiment, the good query database 60 can be created and/or updated on a periodic basis such as, but not limited to, daily, weekly, etc. In an embodiment, the good query database 60 may not include each query that is identified as being associated with a product in the catalog database 65. That is, there may be a maximum number of entries retained in the good query database 60. The maximum number can be based on, for example, a minimum number of times the query has been entered by users. In an embodiment, one or more entries may be excluded from the good query database 60 because the query includes a misspelling, profanity, is too similar to another entry, or includes a brand name that is not sold by the retailer.

The catalog database 65 can include a variety of information on products available from the retailer. In an embodiment, the products included in the catalog database 65 may be those products that are available for purchase from the retailer, including products that are available through the retailer's website or in a retail store of the retailer. In an embodiment, the catalog database 65 can include identifying information about each of the products available for purchase from the retailer. For example, the catalog database 65 can include information such as, but not limited to, a title of the product, a brand associated with the product, a category associated with the product, or the like.

The popular brand database 70 can include a listing of brands associated with search queries which have been searched by users and that have been identified as being in the catalog database 65. That is, in one embodiment entries in the popular brand database 70 should also be present in the catalog database 65. The popular brand database 70 can include additional information such as, but not limited to, statistical information which can include, for example, a ranking score for the brand. The ranking score can, for example, be an indicator of how often the brand results in a positive action (e.g., a click, a cart add, a purchase, etc.) for the retailer. The statistical information including the ranking score can be determined based on the information in the clickstream database 55. In an embodiment, the popular brand database 70 can be created, for example, based on information that is available in the clickstream database 55 and the catalog database 65. In an embodiment, the popular brand database 70 can be created and/or updated on a periodic basis such as, but not limited to, daily, weekly, etc. In an embodiment, the popular brand database 70 may be limited to a maximum number of entries. In an embodiment, the popular brand database 70 may not be limited to a maximum number of entries, but may have brands that are not sold by the retailer, profane words, or the like removed from the popular brand database 70.

The important word database 75 can include a listing of entries that indicate an importance of a word in an electronic search query that corresponds to or relates to a product within the retailer's catalog of products. Accordingly, the important word database 75 can include a ranking score to indicate how important the word is within the catalog. The importance of the word can be used, for example, when providing an electronic query suggestion (see FIGS. 2-7 below) to identify electronic query suggestions that are based on emphasizing importance of a word within the electronic search query submitted by the user. For example, if the user submits an electronic search query "baby boy clothes," the important word database 75 can be utilized to provide electronic query suggestions that are based on one of the words (e.g., baby or boy or clothes) being more important within the catalog database 65.

The important category database 80 can be similar to the important word database 75. However, the important category database 80 can include a listing of entries that indicate an importance of a category within the retailer's catalog of products.

The important brand database 85 can be similar to the important word database 75 and/or the important category database 80. The important brand database 85 can include a listing of entries that indicate an importance of a brand within the retailer's catalog of products.

The database 30 can include additional information such as, but not limited to, a user history database, a session history database, or the like.

It is to be appreciated that one or more of the databases 55-85 can be combined and that a structure of the database 30 is not intended to be limited to the illustrated embodiment.

The suggestion building means 90 can, for example, use information from the clickstream database 55 to build the good query database 60 and the popular brand database 70. The building of the databases 60 and 70 is discussed in further detail in accordance with FIGS. 4 and 5 below. In an embodiment, the suggestion building means 90 can electronically extract data from the clickstream database 55, compare the extracted data with data in the catalog database 65, and selectively include portions of the data in the good query database 60 and the popular brand database 70. Additionally, the suggestion building means 90 can determine term frequency of an electronic search term, ranking scores, or the like.

The historical suggestion builder 45 can build the good query database 60 and the popular brand database 70 on a periodic basis. For example, the suggestion builder 45 can extract the data on a weekly basis, daily basis, hourly basis, etc. In an embodiment, a daily basis may be preferred to provide a relatively more accurate spell checker correction.

The search engine 35 can be used to determine electronic search results for a particular electronic search query. The search engine 35 can be provided with the user's electronic search query in the same manner as the electronic search query was input. For example, if a user searches for "green apples," the search engine 35 may be provided with an electronic search query "green apples" and electronically return all products satisfying the electronic search query as a search results list. In an embodiment, the search engine 35 may be provided with a suggested electronic search query. For example, if the user electronically searches for "baby boy clothes," and the user is provided with a suggestion of "baby boy pajamas," and the user selects the "baby boy pajamas" suggestion, the search engine 35 may be provided with an electronic search query "baby boy pajamas."

Figure 2:
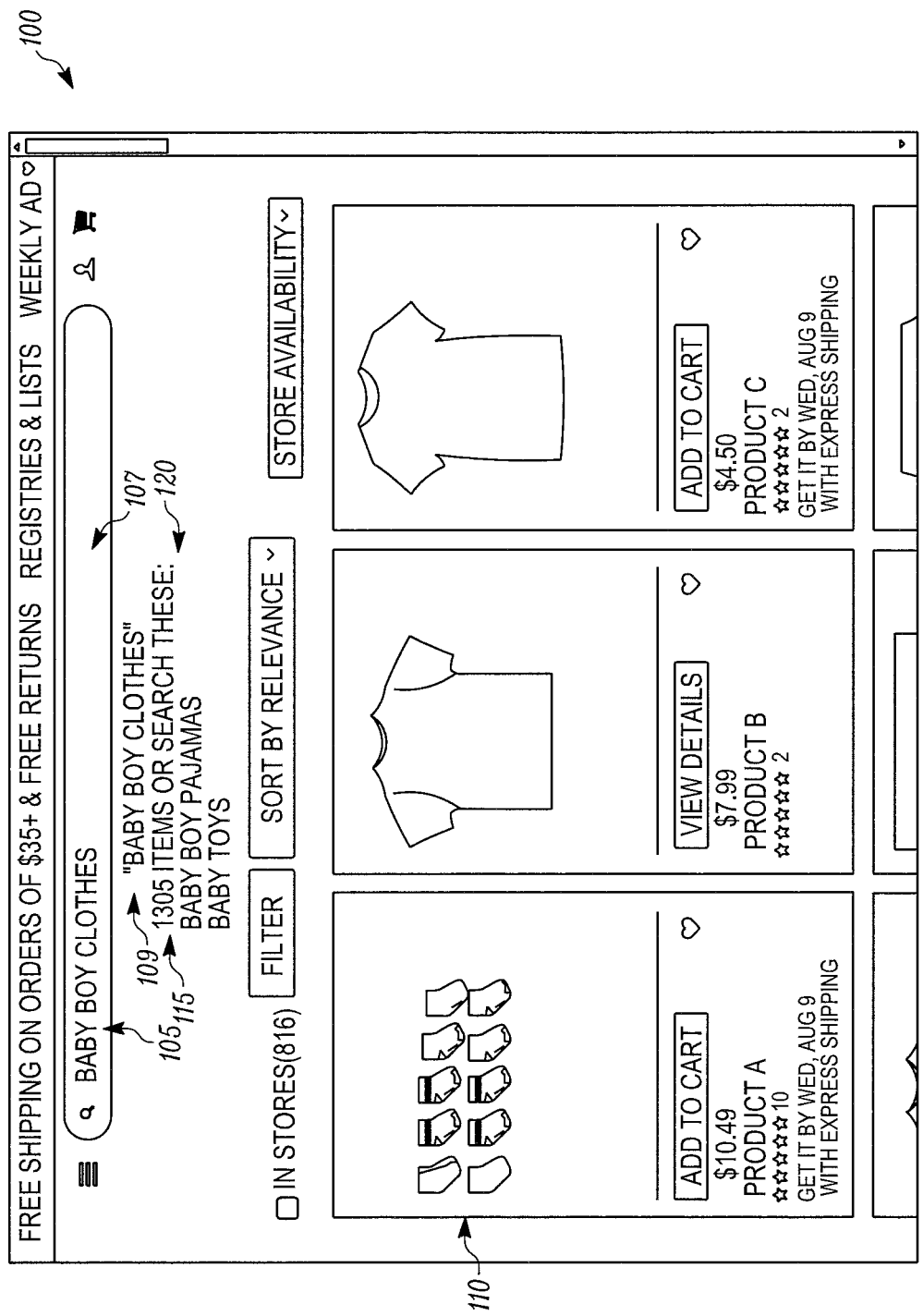
FIG. 2 is a schematic diagram of a graphical user interface (GUI) showing electronic search results and including one or more suggested electronic search queries, according to an embodiment.

FIG. 2 is a schematic diagram of an example of a graphical user interface (GUI) 100 showing electronic search results and including one or more suggested electronic search queries 120, according to an embodiment.

The GUI 100 displays an electronic search query 105. In the illustrated embodiment, the electronic search query 105 includes a phrase "baby boy clothes." It will be appreciated that the text of the electronic search query 105 is an example and that the text can vary according to an input provided by a user. In an embodiment, the electronic search query 105 can include text. In an embodiment, the electronic search query 105 can include text and special characters or other Boolean operators. In the illustrated embodiment, the electronic search query 105 is shown in two locations. In one of the locations, the electronic search query 105 is in a text input 107. In the other of the locations, the electronic search query 105 is shown as a header 109 indicating what electronic search results are shown below.

The GUI 100 includes a set of products 110 which are representative of electronic search results for the electronic search query 105. The set of products 110 can include a variety of information describing a particular electronic search result and which can enable purchase of the products.

The GUI 100 includes a results indicator 115. The results indicator 115 can be, for example, an indicator of how many results are included in the set of products 110. For example, in the illustrated embodiment, a search of "baby boy clothes" resulted in 1,305 products in the set of products 110. In an embodiment, the results indicator may be optional.

The GUI 100 also includes one or more suggested electronic search queries 120. In the illustrated embodiment, the one or more suggested electronic search queries 120 represent alternative electronic search queries to the query 105. The one or more suggested electronic search queries 120 are representative of queries that might assist the user with refining her search (e.g., baby boy clothes can be presented with the refined baby boy pajamas) or that might redirect the user (e.g., baby boy clothes can be presented with baby toys). It will be appreciated that a number of suggested electronic search queries can vary. In an embodiment, there can be more than two suggested electronic search queries. In an embodiment, the number of suggested electronic search queries may be maintained below a maximum number, such as, but not limited to, six. This can, for example, prevent the GUI 100 from becoming cluttered and distracting the user from the set of products 110.

In an embodiment, the suggested electronic search queries can be presented at a different location in the GUI 100. For example, the suggested electronic search queries can be presented at a bottom of the GUI 100. It will be appreciated that these variations are within the scope of the embodiments described in this specification.

The suggested electronic search queries 120 can be selectable by the user. For example, the suggested electronic search queries 120 can be a hyperlink that, when selected by the user, causes the selected electronic search query suggestion to be provided to a search engine, which subsequently provides a new set of products based on the suggested electronic search query as submitted. For example, the text may be selectable to cause the selected electronic search query to be provided to the search engine. In an embodiment, the hyperlink can include an image or otherwise selectable area near or surrounding the text of the suggested queries 120. In an embodiment, if a confidence score is below a threshold, then the suggested queries 120 may not be displayed.

It will be appreciated that the GUI 100 can include additional features. For example, the user may be able to filter or otherwise sort the set of products 110. For simplicity, these separate features are not described in additional detail.

Figure 3:
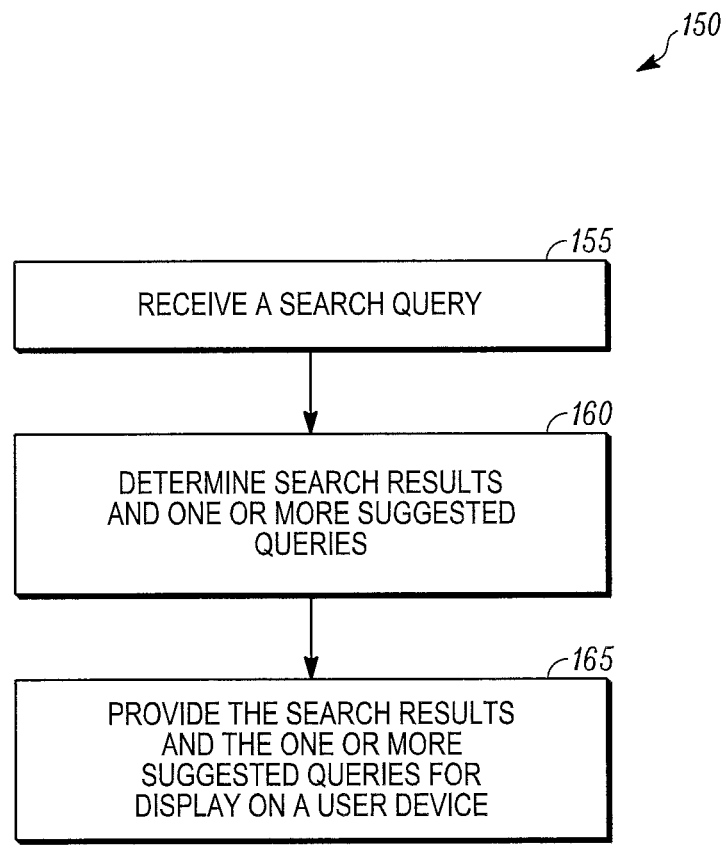
FIG. 3 is a flowchart of a method for providing one or more electronic search results and one or more suggested electronic search queries, according to an embodiment.

FIG. 3 is a flowchart of a method 150 for providing one or more electronic search results and one or more suggested electronic search queries, according to an embodiment.

The method 150 begins at 155 when an electronic search query is received by a server (e.g., the server 25 in FIG. 1). Upon receiving the electronic search query, the server provides the electronic search query to a search engine (e.g., the search engine 35 in FIG. 1) at 160. The search engine can be utilized to identify one or more products in a database (e.g., the catalog database 65 in FIG. 1). Results from the search engine can be compiled into a set of products (e.g., a search results list). It will be appreciated that additional processing may be performed by the search system prior to submitting the electronic search query to the search engine that may improve a quality of the set of products included in the search results list. For example, the electronic search query may be spell corrected, classified, etc. Also at 160, the server provides the electronic search query to a suggestion candidate generator (e.g., suggestion candidate generator 40 in FIG. 1). The suggestion candidate generator can determine one or more suggested electronic search queries. The one or more suggested electronic search queries can then be reduced in number according to a ranking scoring.

At 165, the one or more suggested electronic search queries and the electronic search results are provided by the server for display on the user device (e.g., the user device 15 in FIG. 1).

Figure 4:
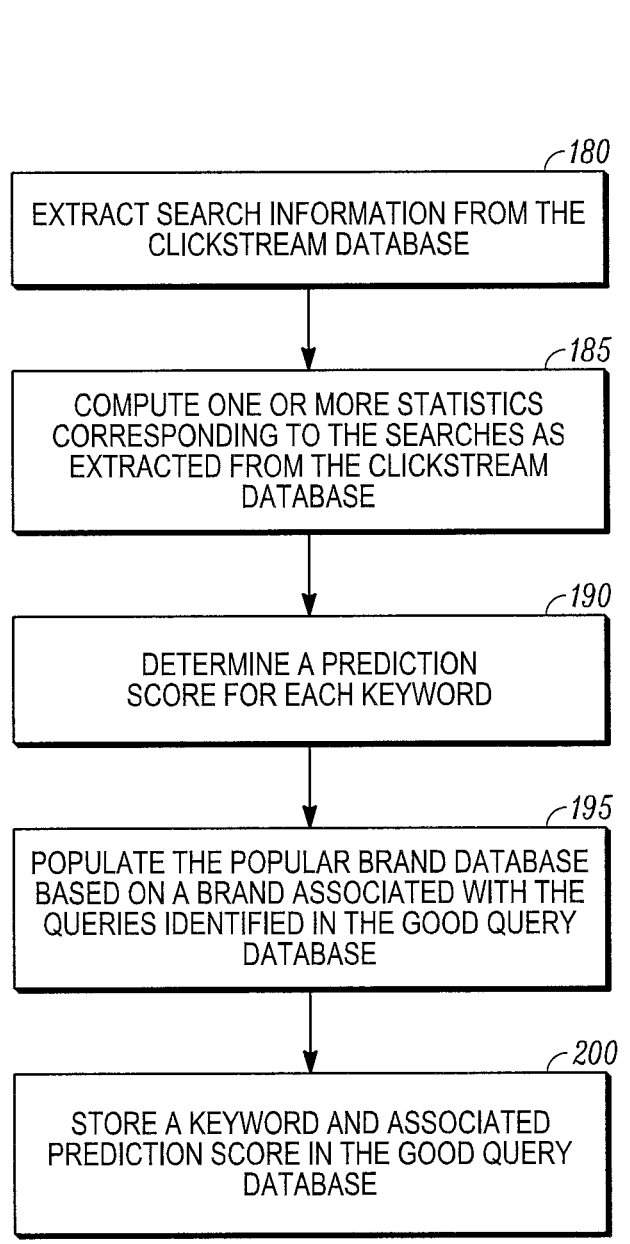
FIG. 4 is a flowchart of a method for identifying possible suggested electronic search queries based on historical information, according to an embodiment.

FIG. 4 is a flowchart of a method 175 for identifying possible suggested electronic search queries based on historical information using the system 10 shown in FIG. 1, according to an embodiment. In an embodiment, the method 175 can be executed on a daily basis. For example, the method 175 can be executed once every day to update the good query database 60 and the popular brand database 70. It will be appreciated that the method 175 may be executed at any time, regardless of whether a user has submitted an electronic search query, as the method 175 generally populates the information into the good query database 60 and the popular brand database 70 for use in providing one or more electronic search results and one or more suggested electronic search queries (see the method 150 shown in FIG. 3 or the method 325 shown in FIG. 7).

At 180, the server 25 (e.g., the historical suggestion builder 45) extracts search information from the clickstream database 55. In an embodiment, the historical suggestion builder 45 can extract a subset of the data that is stored in the clickstream database 55. For example, in an embodiment in which the clickstream database 55 includes electronic search information for the past one year, the historical suggestion builder 45 can extract electronic search information from the clickstream database 55 from a period of time that is less than one year. In an embodiment, the historical suggestion builder 45 can extract electronic search information from the clickstream database 55 for a period of time that includes the previous 180 days (e.g., six months). It will be appreciated that the period of time can vary beyond the stated value. For example, in an embodiment the period of time can be less than six months, while in another embodiment, the period of time can be greater than six months.

At 185, one or more statistics corresponding to the electronic searches as extracted from the clickstream database 55 are computed. In an embodiment, computing one or more statistics can include determining a count of actions corresponding to each electronic search query in the clickstream database 55. For example, the historical suggestion builder 45 can count each occurrence of a particular electronic search query in the clickstream database 55. More particularly, the historical suggestion builder 45 can count each action associated with an occurrence of the particular electronic search query. For example, if an electronic search query is "comforter," the historical suggestion builder 45 can identify (1) how many times the search "comforter" was entered, (2) how many times an item was selected from the search results when the search "comforter" was entered (e.g., identify a number of times the search resulted in a click action by the user), and (3) how many times the user added an item to her cart when the electronic search query "comforter" was entered.

At 190 a prediction score is determined for each keyword. The prediction score can be based on a weighting system depending on, for example, actions taken by the users having input the particular keyword. For example, in an embodiment, a cart add action can have a greater weight than a search click, and the search click can have a greater weight than the search entry. In an embodiment, the actions taken can be weighted based on timing within the clickstream data. For example, actions taken more recently may be given a higher weight in determining the prediction score, while actions taken less recently may be given a lower weight in determining the prediction score. In an embodiment, the prediction score can also be weighted based on a length of the keyword as compared to a length of a subset of characters of the keyword. For example, the keyword "comforter" can be split into a variety of character combinations "c," "co," "com," "comf," etc.

At 195, the popular brand database 70 is populated based on a brand associated with the queries identified in the good query database 60. For example, a number N of brands can be identified from the good query database 60 for the popular brand database 70. The brands selected can include brands associated with a relatively largest number of electronic search queries in the good query database 60. For example, the top 1,000 brands based on a number of occurrences in the good query database 60 can be identified in the popular brand database 70. It will be appreciated that these numbers are examples and that the number of brands can vary according to the principles described in this specification.

At 200, a keyword and associated prediction score is stored in the good query database 60. The keyword and associated prediction score can be ordered from highest score to lowest score, according to an embodiment. In an embodiment, the keywords can be ordered alphabetically first, and by prediction score second.

Figure 5:
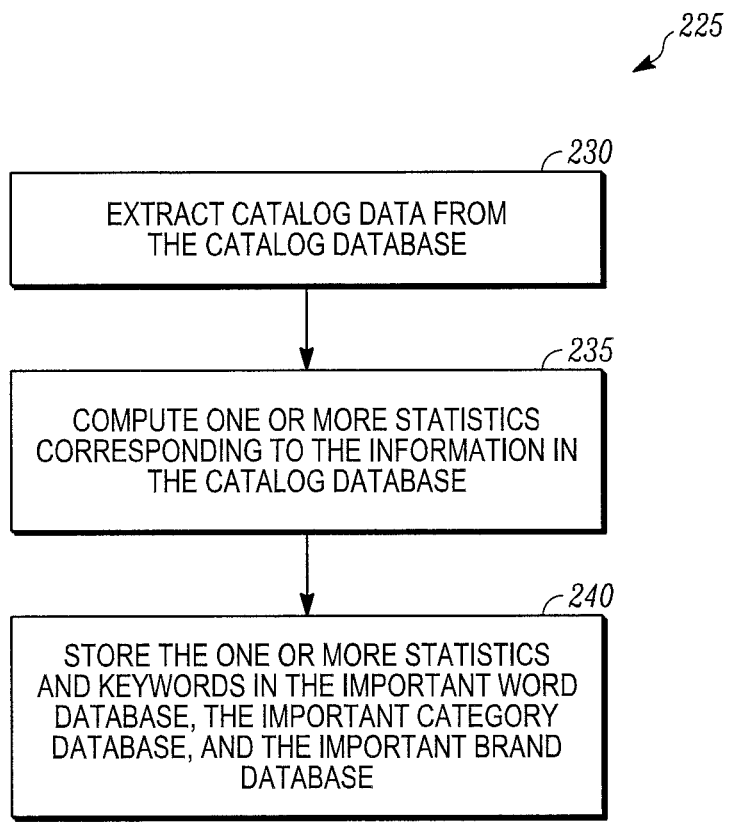
FIG. 5 is a flowchart of a method for identifying possible suggested electronic search queries based on catalog information, according to an embodiment.
Figure 7:
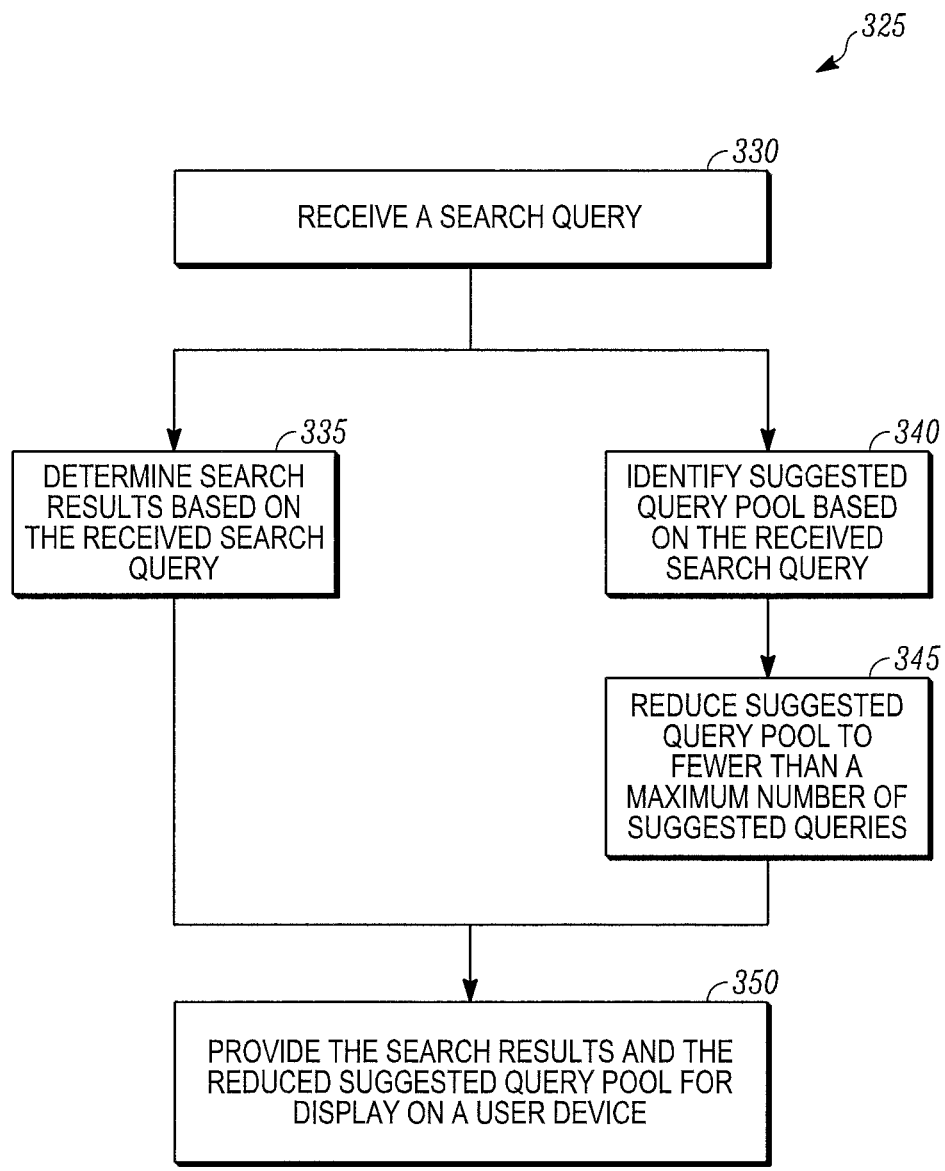
FIG. 7 is a flowchart of a method for providing one or more electronic search results and one or more suggested electronic search queries, according to an embodiment.

FIG. 5 is a flowchart of a method 225 for identifying possible suggested electronic search queries based on catalog information using the system 10 shown in FIG. 1, according to an embodiment. In an embodiment, the method 225 can be executed on a daily basis. For example, the method 225 can be executed once every day to update the important word database 75, the important category database 80, and the important brand category database 85. It will be appreciated that the method 225 may be executed at any time, regardless of whether a user has submitted an electronic search query, as the method 225 generally populates the information into the important word database 75, the important category database 80, and the important brand category database 85 for use in performing the method 150 (FIG. 3) or the method 325 (FIG. 7). In an embodiment, the method 225 and the method 175 (FIG. 4) may be executed concurrently by the server 25.

At 230, the server 25 extracts catalog data from the catalog database 65. In an embodiment, the catalog suggestion builder 50 can extract a subset of the data that is stored in the catalog database 65. For example, the catalog suggestion builder 50 can extract the data from the catalog database 65 that has changed since a previous extraction.

That is, the catalog suggestion builder 50 can extract only the new information and/or information that has changed in the catalog database 65 since the previous extraction. Alternatively, the catalog suggestion builder 50 can extract all data within the catalog database 65.

At 235, one or more statistics corresponding to the information in the catalog database 65 can be computed. For example, the computations can be utilized to determine which tokens are important (e.g., based on frequency, concentration, diversity, etc.); to determine the relationships between the tokens and the categories; to determine the relationships between the tokens and the brands; and to determine a ranking order. For example, the catalog suggestion builder 50 can determine an importance of the words in the dictionary. For example, high frequency words may indicate a higher importance. High concentration words may indicate a higher importance. Low diversity words (e.g., in a limited number of categories) may indicate a higher importance. The importance of the word may be calculated using a formula that includes these factors.

At 240, the one or more statistics are utilized to create the important word database 75, the important category database 80, and the important brand database 85.

Figure 6:
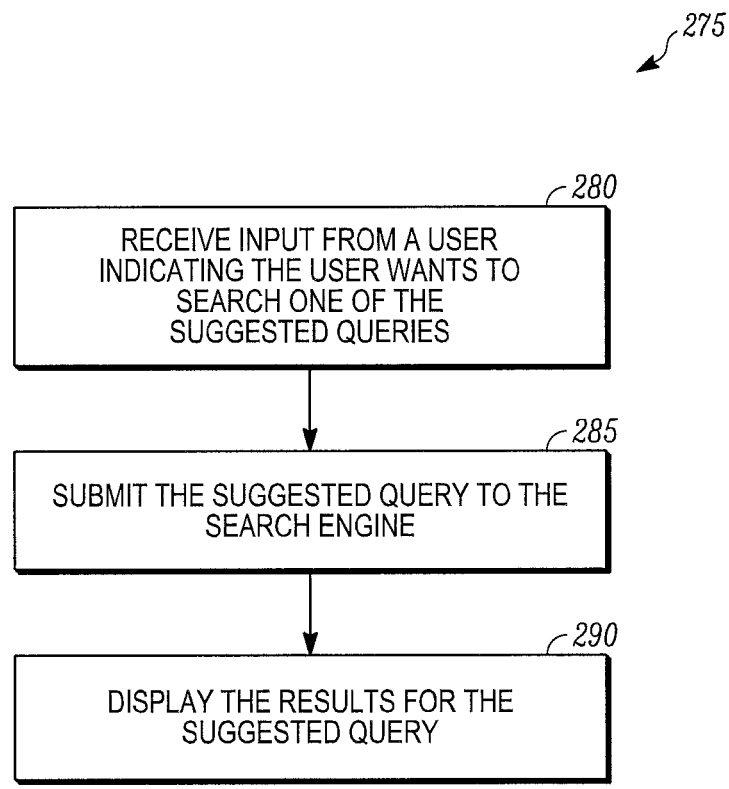
FIG. 6 is a flowchart of a method for utilizing a suggested electronic search query, according to an embodiment.

FIG. 6 is a flowchart of a method 275 for utilizing a suggested electronic search query, according to an embodiment.

At 280, a server (e.g., the server 25 in FIG. 1) receives an input from a user indicating that the user wants to search a suggested electronic search query. This can include, for example, receiving a search request based on a user clicking or otherwise selecting a suggested electronic search query via a hyperlink or other selectable feature in a GUI (e.g., the GUI 100 in FIG. 2). In response to receiving the input, the server submits the suggested electronic search query to a search engine (e.g., the search engine 35 in FIG. 1) at 285. The search engine can use the suggested electronic search query to identify one or more products matching the suggested electronic search query (e.g., to generate a search results list). At 290, the server provides the search results for display on a user device (e.g., the user device 15 in FIG. 1). It will be appreciated that the results of the suggested electronic search query may be displayed in a similar manner to the GUI 100 (FIG. 2), although additional electronic search query suggestions may or may not be included in the display of the results corresponding to the suggested query.

FIG. 7 is a flowchart of a method 325 for providing one or more electronic search results and one or more suggested electronic search queries, according to an embodiment. The method 325 may include aspects that are the same as or similar to the method 150 shown and described in accordance with FIG. 3 above.

The method 325 begins at 330 when an electronic search query is received by a server (e.g., the server 25 in FIG. 1). Upon receiving the electronic search query, the server provides the electronic search query to a search engine (e.g., the search engine 35 in FIG. 1) at 335. The search engine is utilized to identify one or more products in a database (e.g., the catalog database 65 in FIG. 1). Results from the search engine 35 can be compiled into a set of products (e.g., a search results list). It will be appreciated that additional processing may be performed by the search system prior to submitting the electronic search query to the search engine that may improve a quality of the set of products included in the search results list. For example, the electronic search query may be spell corrected, classified, etc.

At 340, the server provides the electronic search query to a suggestion candidate generator (e.g., suggestion candidate generator 40 in FIG. 1) to identify a pool of suggested electronic search queries (e.g., a suggested electronic search query pool). The suggestion candidate generator determines one or more suggested electronic search queries for the pool of suggested electronic search queries. The pool of suggested electronic search queries can be determined using a plurality of approaches. These approaches include utilization of information prepared via, for example, the methods 175 and 225 shown and described in accordance with FIGS. 4 and 5 above. These include: matching a word importance score; matching a best n-gram; category classification; historical brand alignment; and/or catalog brand alignment, etc. It will be appreciated that the method 325 can utilize one or more of these methods. In an embodiment, a number of suggested electronic search queries for each of the one or more methods can be used to form the pool of suggested electronic search queries.

The pool of suggested electronic search queries is reduced at 345 to include less than a maximum number of suggested electronic search queries. For example, a maximum number of suggested electronic search queries may be set at 6, in which case the pool of suggested electronic search queries may be reduced to fewer than 6 suggested queries. The reduction in number of electronic search queries can be, for example, based on selecting a top suggestion from each of the methods forming the pool of suggested electronic search queries. Alternatively, the reduction can include removing any suggested electronic search query in the pool of suggested electronic search queries that does not have a new token different from the electronic search queries already selected. In an embodiment, the suggested electronic search queries in the pool of suggested electronic search queries can be ranked based on their ranking scores, and the top N suggestions can be selected, regardless of a method by which the suggestion was generated.

At 350, the one or more suggested electronic search queries and the search results are provided by the server for display on a user device (e.g., the user device 15 shown in FIG. 1). An order of the one or more suggested electronic search queries may be determined from the ranking score associated with the suggested electronic search queries. For example, the suggested electronic search queries having the relatively highest ranking score may be displayed first, and then sequentially based on the ranking scores.

Figure 8:
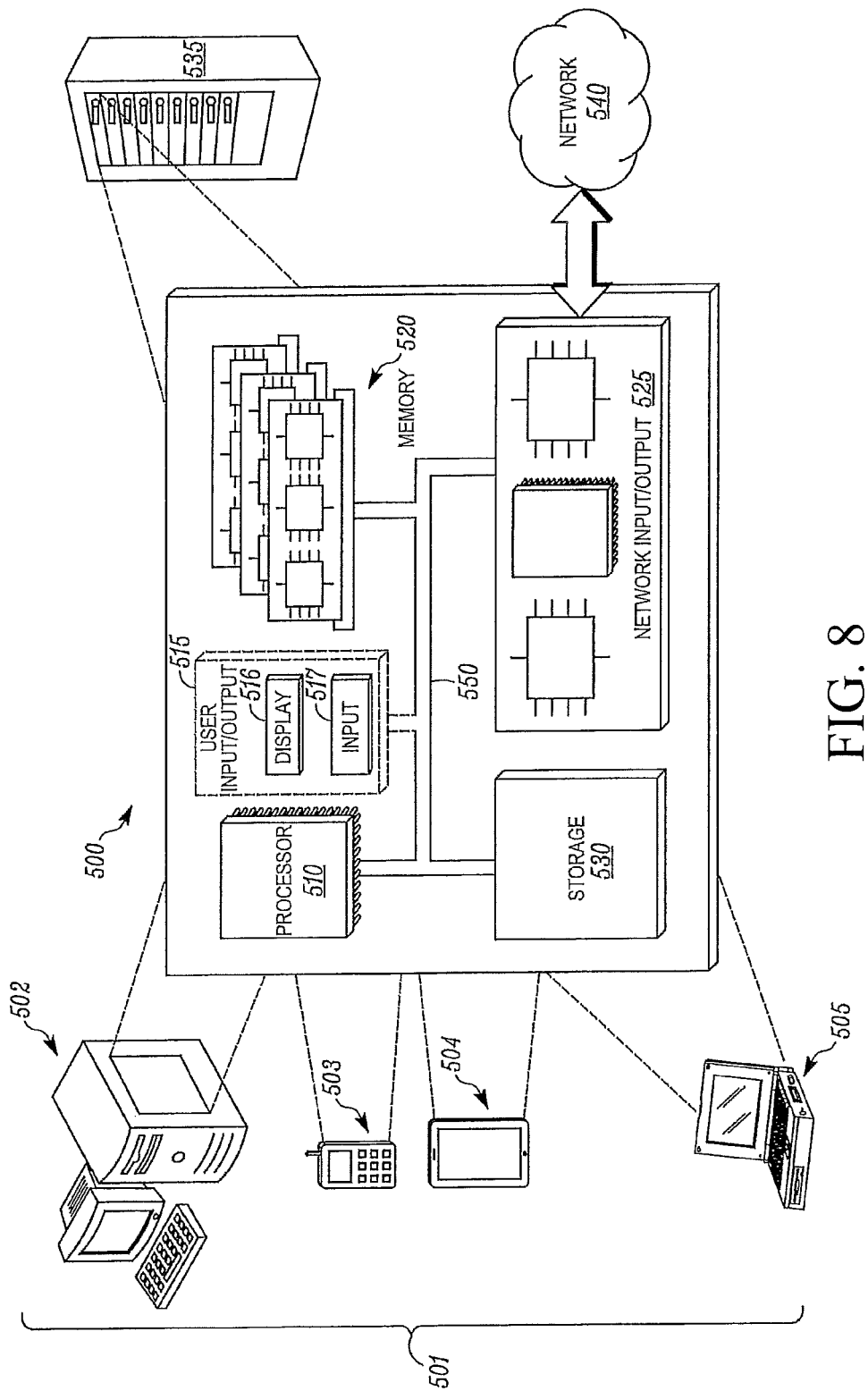
FIG. 8 is a schematic diagram of an architecture for a computer device, according to an embodiment.

FIG. 8 is a schematic diagram of an architecture for a computer device 500, according to an embodiment. The computer device 500 and any of the individual components thereof can be used for any of the operations described in accordance with any of the computer-implemented methods described herein.

The computer device 500 generally includes a processor 510, memory 520, a network input/output (I/O) 525, storage 530, and an interconnect 550. The computer device 500 can optionally include a user I/O 515, according to some embodiments. The computer device 500 can be in communication with one or more additional computer devices 500 through a network 540.

The computer device 500 is generally representative of hardware aspects of a variety of user devices 501 and a server device 535. The illustrated user devices 501 are examples and are not intended to be limiting. Examples of the user devices 501 include, but are not limited to, a desktop computer 502, a cellular/mobile phone 503, a tablet device 504, and a laptop computer 505. It is to be appreciated that the user devices 501 can include other devices such as, but not limited to, a personal digital assistant (PDA), a video game console, a television, or the like. In some embodiments, the user devices 501 can alternatively be referred to as client devices 501. In such embodiments, the client devices 501 can be in communication with the server device 535 through the network 540. One or more of the client devices 501 can be in communication with another of the client devices 501 through the network 540 in some embodiments.

The processor 510 can retrieve and execute programming instructions stored in the memory 520 and/or the storage 530. The processor 510 can also store and retrieve application data residing in the memory 520. The interconnect 550 is used to transmit programming instructions and/or application data between the processor 510, the user I/O 515, the memory 520, the storage 530, and the network I/O 540. The interconnect 550 can, for example, be one or more busses or the like. The processor 510 can be a single processor, multiple processors, or a single processor having multiple processing cores. In some embodiments, the processor 510 can be a single-threaded processor. In some embodiments, the processor 510 can be a multi-threaded processor.

The user I/O 515 can include a display 516 and/or an input 517, according to some embodiments. It is to be appreciated that the user I/O 515 can be one or more devices connected in communication with the computer device 500 that are physically separate from the computer device 500. For example, the display 516 and input 517 for the desktop computer 502 can be connected in communication but be physically separate from the computer device 500. In some embodiments, the display 516 and input 517 can be physically included with the computer device 500 for the desktop computer 502. In some embodiments, the user I/O 515 can physically be part of the user device 501. For example, the cellular/mobile phone 503, the tablet device 504, and the laptop 505 include the display 516 and input 517 that are part of the computer device 500. The server device 535 generally may not include the user I/O 515. In some embodiments, the server device 535 can be connected to the display 516 and input 517.

The display 516 can include any of a variety of display devices suitable for displaying information to the user. Examples of devices suitable for the display 516 include, but are not limited to, a cathode ray tube (CRT) monitor, a liquid crystal display (LCD) monitor, a light emitting diode (LED) monitor, or the like.

The input 517 can include any of a variety of input devices or input means suitable for receiving an input from the user. Examples of devices suitable for the input 517 include, but are not limited to, a keyboard, a mouse, a trackball, a button, a voice command, a proximity sensor, an ocular sensing device for determining an input based on eye movements (e.g., scrolling based on an eye movement), or the like. It is to be appreciated that combinations of the foregoing inputs 517 can be included for the user devices 501. In some embodiments the input 517 can be integrated with the display 516 such that both input and output are performed by the display 516.

The memory 520 is generally included to be representative of a random access memory such as, but not limited to, Static Random Access Memory (SRAM), Dynamic Random Access Memory (DRAM), or Flash. In some embodiments, the memory 520 can be a volatile memory. In some embodiments, the memory 520 can be a non-volatile memory. In some embodiments, at least a portion of the memory can be virtual memory.

The storage 530 is generally included to be representative of a non-volatile memory such as, but not limited to, a hard disk drive, a solid state device, removable memory cards, optical storage, flash memory devices, network attached storage (NAS), or connections to storage area network (SAN) devices, or other similar devices that may store non-volatile data. In some embodiments, the storage 530 is a computer readable medium. In some embodiments, the storage 530 can include storage that is external to the computer device 500, such as in a cloud.

The network I/O 525 is configured to transmit data via a network 540. The network 540 may alternatively be referred to as the communications network 540. Examples of the network 540 include, but are not limited to, a local area network (LAN), a wide area network (WAN), the Internet, or the like. In some embodiments, the network I/O 525 can transmit data via the network 540 through a wireless connection using Wi-Fi, Bluetooth, or other similar wireless communication protocols. In some embodiments, the computer device 500 can transmit data via the network 540 through a cellular, 3G, 4G, or other wireless protocol. In some embodiments, the network I/O 525 can transmit data via a wire line, an optical fiber cable, or the like. It is to be appreciated that the network I/O 525 can communicate through the network 540 through suitable combinations of the preceding wired and wireless communication methods.

The server device 535 is generally representative of a computer device 500 that can, for example, respond to requests received via the network 540 to provide, for example, data for rendering a website on the user devices 501. The server 535 can be representative of a data server, an application server, an Internet server, or the like.

Aspects described herein can be embodied as a system, method, or a computer readable medium. In some embodiments, the aspects described can be implemented in hardware, software (including firmware or the like), or combinations thereof. Some aspects can be implemented in a non-transitory, tangible computer readable medium, including computer readable instructions for execution by a processor. Any combination of one or more computer readable medium(s) can be used.

The computer readable medium can include a computer readable signal medium and/or a computer readable storage medium. A computer readable storage medium can include any tangible medium capable of storing a computer program for use by a programmable processor to perform functions described herein by operating on input data and generating an output. A computer program is a set of instructions that can be used, directly or indirectly, in a computer system to perform a certain function or determine a certain result. Examples of computer readable storage media include, but are not limited to, a floppy disk; a hard disk; a random access memory (RAM); a read-only memory (ROM); a semiconductor memory device such as, but not limited to, an erasable programmable read-only memory (EPROM), an electrically erasable programmable read-only memory (EEPROM), Flash memory, or the like; a portable compact disk read-only memory (CD-ROM); an optical storage device; a magnetic storage device; other similar device; or suitable combinations of the foregoing. A computer readable signal medium can include a propagated data signal having computer readable instructions. Examples of propagated signals include, but are not limited to, an optical propagated signal, an electro-magnetic propagated signal, or the like. A computer readable signal medium can include any computer readable medium that is not a computer readable storage medium that can propagate a computer program for use by a programmable processor to perform functions described herein by operating on input data and generating an output.

Some embodiments can be provided to an end-user through a cloud-computing infrastructure. Cloud computing generally includes the provision of scalable computing resources as a service over a network (e.g., the Internet or the like).

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A computer-implemented method, comprising:
receiving, by a server, an electronic search query from a user device of a user via a retail website or application, the electronic search query including one or more keywords;
obtaining one or more search results responsive to the electronic search query;
obtaining a suggested electronic search query based on the electronic search query as received, the suggested electronic search query including one of a refinement to the electronic search query and a redirection of the electronic search query, the suggested electronic search query being determined based on search information representative of an importance of the electronic search query, wherein obtaining the suggested electronic search query includes identifying possible suggested electronic search queries based on historical information and based on catalog information,
wherein identifying the possible suggested electronic search queries based on the historical information includes:
extracting the search information from a clickstream database that includes a listing of a plurality of previous electronic search queries performed on the retail website or application and clicks performed in response to each of the plurality of previous electronic search queries over a particular period of time,
computing a search statistic corresponding to the search information, wherein the search statistic includes a count of each action taken associated with an occurrence of each of the plurality of previous electronic search queries,
determining a prediction score for each of a plurality of previous keywords in the plurality of previous electronic search queries based on a weighting system,
populating a popular brand database based on a brand associated with each of the plurality of previous electronic search queries, and
storing each of the plurality of previous keywords with its prediction score in a good query database; and
wherein identifying the possible suggested electronic search queries based on the catalog information includes:
extracting catalog data from a catalog database, wherein the catalog database includes product information regarding products available via the retail website or application,
computing a catalog statistic corresponding to the product information in the catalog database, and
creating an important word database, an important category database, and an important brand database based on the catalog statistic, the important word database indicating an importance of the one or more keywords in the electronic search query corresponding to a product within a retailer's catalog of products, the important category database indicating an importance of a category within the retailer's catalog of products, and the important brand database indicating an importance of a brand within the retailer's catalog of products;
generating an electronic response including the one or more search results and the suggested electronic search query for display on a display of the user device; and
providing the electronic response including the one or more search results and the suggested electronic search query to the user device for display on the display of the user device via a network, wherein the suggested electronic search query is provided as a hyperlink, when the user selects the suggested electronic search query, a request is electronically sent to the server and one or more search results are obtained in response to the suggested electronic search query, the suggested electronic search query being different from, but related to, the electronic search query as received.

2. The computer-implemented method according to claim 1, wherein obtaining the suggested electronic search query includes identifying a suggested electronic search query pool based on the received electronic search query.

3. The computer-implemented method according to claim 2, further comprising reducing a number of entries in the suggested electronic search query pool to less than a maximum number of suggested electronic search queries.

4. The computer-implemented method according to claim 1, wherein the suggested electronic search query includes a plurality of suggested electronic search queries, further comprising ordering the plurality of suggested electronic search queries for display according to a ranking score for each of the plurality of suggested electronic search queries.

5. The computer-implemented method according to claim 4, wherein the ranking score is determined based on a weighting of actions performed as indicated in the clickstream database.

6. The computer-implemented method according to claim 1, further comprising updating the good query database, the popular brand database, the important word database, the important category database, and the important brand database on a periodic basis to provide a plurality of databases storing candidates for the suggested electronic search query.

7. The computer-implemented method according to claim 6, wherein the suggested electronic search query is selected from one of the good query database, the popular brand database, the important word database, the important category database, and the important brand database.

8. The computer-implemented method according to claim 1, wherein the electronic search query includes a first token and the suggested electronic search query includes a second token, the first token and the second token being the same.

9. The computer-implemented method according to claim 1, wherein the electronic search query includes a first token and the suggested electronic search query includes a second token, the second token being a synonym of the first token.

10. The computer-implemented method according to claim 1, wherein computing the search statistic includes identifying: how many times each of the plurality of previous electronic search queries was entered, how many time times an item was selected from a plurality of previous search results upon each of the plurality of previous electronic search queries being entered, and how many times the item is added to a shopping cart upon each of the plurality of previous electronic search queries being entered.

11. The computer-implemented method according to claim 1, wherein computing the catalog statistic includes determining which of a plurality of tokens are important based on one or more of a frequency, a concentration, a diversity of each of the plurality of tokens; determining relationships between each of the plurality of tokens and each of a plurality of categories; and determining relationships between each of the plurality of tokens and each of a plurality of brands.

12. A system, comprising:
a server that includes a hardware processor, a memory, and a non-transitory storage, wherein the hardware processor is configured to retrieve and execute instructions stored in one of the memory and the non-transitory storage, wherein the non-transitory storage includes:
a historical suggestion builder that generates a first plurality of databases that store one or more first electronic search query suggestions;
a catalog suggestion builder that generates a second plurality of databases that store one or more second electronic search query suggestions; and
a suggestion candidate generator that, in response to electronically receiving an electronic search query input from a user device, identifies one or more suggested electronic search queries from the one or more first electronic search query suggestions and the one or more second electronic search query suggestions, wherein identifying the one or more suggested electronic search query includes identifying possible suggested electronic search queries based on historical information and based on catalog information,
wherein identifying the possible suggested electronic search queries based on the historical information includes:
extracting search information from a clickstream database that includes a listing of a plurality of previous electronic search queries performed on a retail website or application and clicks performed in response to each of the plurality of previous electronic search queries over a particular period of time,
computing a search statistic corresponding to the search information, wherein the search statistic includes a count of each action taken associated with an occurrence of each of the plurality of previous electronic search queries,
determining a prediction score for each of a plurality of previous keywords in the plurality of previous electronic search queries based on a weighting system,
populating a popular brand database based on a brand associated with each of the plurality of previous electronic search queries, and
storing each of the plurality of previous keywords with its prediction score in a good query database; and
wherein identifying the possible suggested electronic search queries based on the catalog information includes:
extracting catalog data from a catalog database, wherein the catalog database includes product information regarding products available via the retail website or application,
computing a catalog statistic corresponding to the product information in the catalog database, and
creating an important word database, an important category database, and an important brand database based on the catalog statistic, the important word database indicating an importance of one or more keywords in the electronic search query corresponding to a product within a retailer's catalog of products, the important category database indicating an importance of a category within the retailer's catalog of products, and the important brand database indicating an importance of a brand within the retailer's catalog of products;
wherein the server provides the one or more suggested electronic search queries for display on a display of the user device, wherein the one or more suggested electronic search queries are provided as hyperlinks, such that when a user selects one of the one or more suggested electronic search queries, a request is electronically sent to the server, and one or more search results in response to the one of the one or more suggested electronic search queries are obtained, the one or more suggested electronic search queries being different from, but related to, an electronic search query received from a user via a retail website or application.

13. The system according to claim 12, wherein the one or more suggested electronic search queries include at least two suggested electronic search queries and the at least two suggested electronic search queries are ordered according to a ranking score associated with the one or more first electronic search query suggestions and the one or more second electronic search query suggestions.

14. The system according to claim 12, further comprising a search engine, wherein the search engine determines one or more original search results based on the electronic search query input as received.

15. The system according to claim 14, wherein the server electronically provides the one or more original search results from the search engine in addition to the one or more suggested electronic search queries for display on the display of the user device.

16. The system according to claim 12, wherein computing the search statistic includes identifying: how many times each of the plurality of previous electronic search queries was entered, how many time times an item was selected from a plurality of previous search results upon each of the plurality of previous electronic search queries being entered, and how many times the item is added to a shopping cart upon each of the plurality of previous electronic search queries being entered.

17. The system according to claim 12, wherein computing the catalog statistic includes determining which of a plurality of tokens are important based on one or more of a frequency, a concentration, a diversity of each of the plurality of tokens; determining relationships between each of the plurality of tokens and each of a plurality of categories; and determining relationships between each of the plurality of tokens and each of a plurality of brands.

18. A query suggestion system for a retail website or application, comprising:
   a suggestion building means that generates a plurality of databases that store one or more keywords and statistical information associated with the one or more keywords, wherein the statistical information includes a ranking score to order the one or more keywords, the ranking score being utilized to determine which of the one or more keywords is appropriate for a suggested electronic search query, wherein the suggestion building means identifies the suggested electronic search query by identifying possible suggested electronic search queries based on historical information and based on catalog information,
   wherein identifying the possible suggested electronic search queries based on the historical information includes:
      extracting search information from a clickstream database that includes a listing of a plurality of previous electronic search queries performed on the retail website or application and clicks performed in response to each of the plurality of previous electronic search queries over a particular period of time,
      computing a search statistic corresponding to the search information, wherein the search statistic includes a count of each action taken associated with an occurrence of each of the plurality of previous electronic search queries,
      determining a prediction score for each of a plurality of previous keywords in the plurality of previous electronic search queries based on a weighting system,
      populating a popular brand database based on a brand associated with each of the plurality of previous electronic search queries, and
      storing each of the plurality of previous keywords with its prediction score in a good query database; and
   wherein identifying the possible suggested electronic search queries based on the catalog information includes:
      extracting catalog data from a catalog database, wherein the catalog database includes product information regarding products available via the retail website or application,
      computing a catalog statistic corresponding to the product information in the catalog database, and
      creating an important word database, an important category database, and an important brand database based on the catalog statistic, the important word database indicating an importance of the one or more keywords in the electronic search query corresponding to a product within a retailer's catalog of products, the important category database indicating an importance of a category within the retailer's catalog of products, and the important brand database indicating an importance of a brand within the retailer's catalog of products.

19. The query suggestion system according to claim 18, wherein the suggestion building means generates the plurality of databases on a periodic basis.

20. The query suggestion system according to claim 18, wherein computing the search statistic includes identifying: how many times each of the plurality of previous electronic search queries was entered, how many time times an item was selected from a plurality of previous search results upon each of the plurality of previous electronic search queries being entered, and how many times the item is added to a shopping cart upon each of the plurality of previous electronic search queries being entered, and
   wherein computing the catalog statistic includes determining which of a plurality of tokens are important based on one or more of a frequency, a concentration, a diversity of each of the plurality of tokens; determining relationships between each of the plurality of tokens and each of a plurality of categories; and determining relationships between each of the plurality of tokens and each of a plurality of brands.

* * * * *